United States Patent Office 3,097,791
Patented July 16, 1963

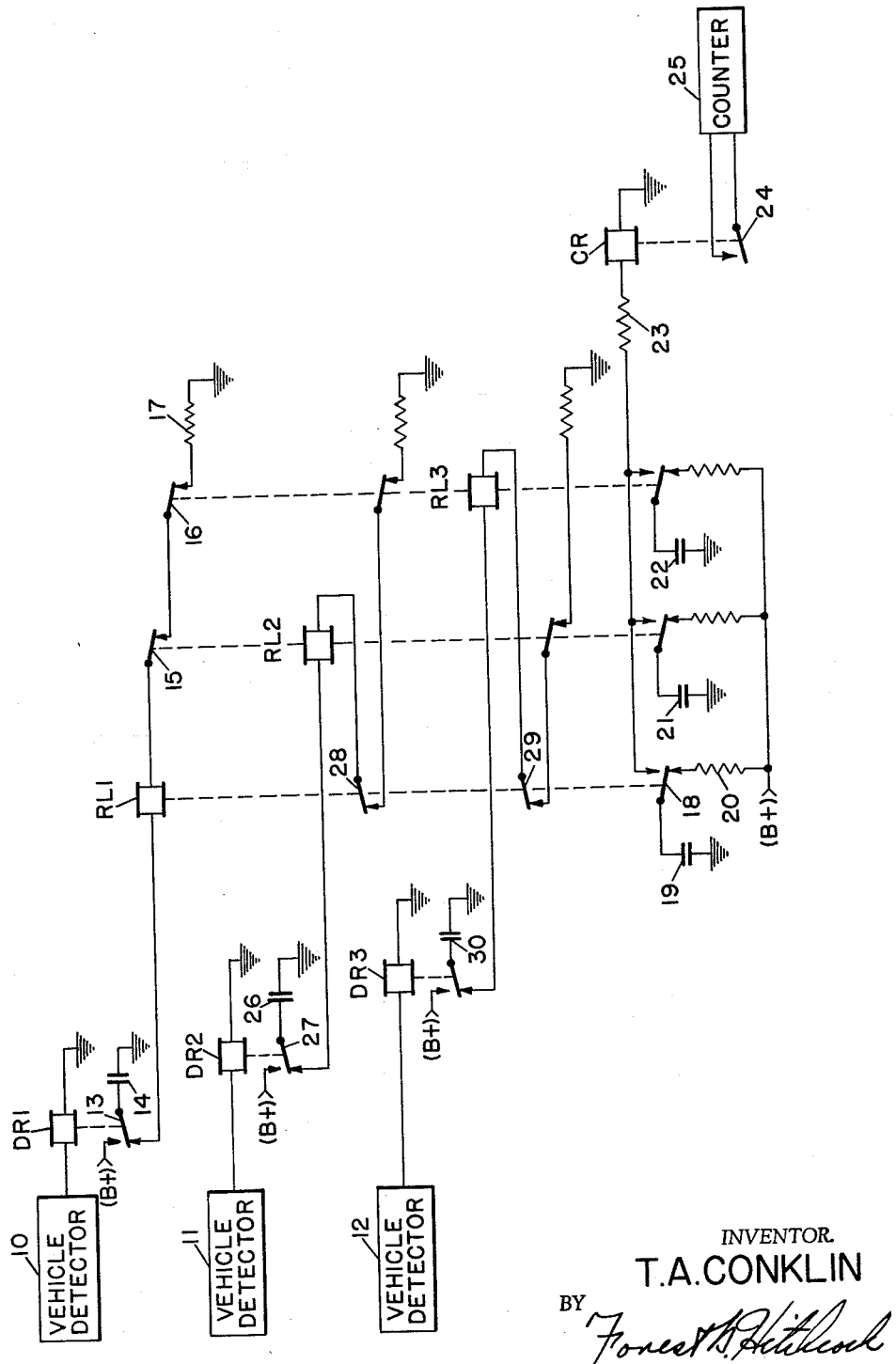

3,097,791
COUNTING SYSTEM
Theodore A. Conklin, Avon, N.Y., assignor to General Signal Corporation, a corporation of New York
Filed Dec. 22, 1961, Ser. No. 161,631
5 Claims. (Cl. 235—99)

This invention relates to a counting system, and more particularly, pertains to a system wherein a single counter responds to randomly occurring counts from a plurality of sources so that two or more counts may occur simultaneously, but where such simultaneously occurring counts will, nevertheless, be counted sequentially by the counter.

The invention has utility in numerous fields where counts originating from a plurality of sources are applied to the single input of a counter in order to be cumulatively totaled thereby. Since the counts may be randomly generated by the respective sources, it follows that the counter input may receive counts concurrently from two or more sources. One specific field of use in which the present invention has been found to have utility is in the counting of vehicles. Several vehicle detectors may be provided at a highway counting station, one for each lane, and their outputs all applied to a common counter so that it will register the total number of vehicles passing the counting location. Alternatively, a vehicle detector may be provided at each entrance and exit to an enclosed area such as a parking lot or parking garage. In such a system, all the entrance detectors may be coupled to an "add" input of a differential counter and all the exit detectors may be similarly coupled to the "subtract" input of the counter so that the differential count displayed by the counter constantly provides data as to the number of vehicles within the parking lot or garage. In either system, vehicles passing along the highway and also vehicles entering the lot or parking garage will generally appear randomly and there is a high probability that vehicles will be detected simultaneously by two or more of the vehicle detectors. It then becomes desirable to provide a convenient means which will permit the counts from the respective vehicle detectors all to be applied to the single counter and also to cause simultaneously occurring counts to be applied in time sequence to the counter. Moreover, it is desirable that an input pulse of uniform amplitude and duration be applied to the counter for each passing vehicle, with the characteristics of the input pulse generally meeting the counter requirements. This is especially desirable where the vehicle detectors are of the type whose output is a function of vehicle speed and vehicle length.

It is thus an object of the present invention to provide a counting system for coupling multiple count sources to a common pulse counter.

It is another object of this invention to provide a pulse counting system employing a counter and receiving randomly occurring input pulses from individual sources so that two or more input counts may occur simultaneously.

It is another object of this invention to provide a counting system wherein simultaneously occurring counts from different sources are converted to time-spaced counts which are sequentially counted by a common counter.

It is a further object of this invention to provide a system for counting vehicles passing one or more counting stations and for registering the total counts of the individual detectors upon a single counter.

It is another object of this invention to provide apparatus for coupling a plurality of count sources to a common counter where the successive counter input pulses have substantially uniform characteristics despite the fact that the respective outputs of the various count sources may be quite different.

In describing this invention, reference will be made to the accompanying drawing which illustrates the preferred embodiment of my invention.

Described briefly, the present invention comprises a system for applying counts from individual sources to a common counter. Each count source has coupled to it a storage means which stores the fact that the associated count source has produced an output count that is to be registered upon the common counter and retains this stored fact until a corresponding input pulse has been applied to the common counter, at which time the stored data is erased. Each storage means has an electro-responsive means coupled thereto which is distinctively operated when the corresponding storage means is storing a count for registration, but all the several electro-responsive means have their circuits so interlocked that only one can be operated to its distinctive condition at any instant. Each electro-responsive device when operated to its distinctive condition causes an input count to be applied to the common counter. When any electro-responsive device has been restored to its initial state upon the registration of the count, any other of these devices is then free to respond to its associated storage means and be operated to thereby cause another input count to be applied to the common counter. Consequently, when counts are generated concurrently by different sources, each such source will store that fact in its associated storage means. It is immaterial that any count source may thereafter be restored to its initial condition before the respective count can be registered on the common counter since the count will be retained in the storage means until it has been able to operate its respective electro-responsive means and the several electro-responsive means can only be operated one at a time; any particular count may, therefore, be registered on the counter after the count source producing that count has been restored to its normal condition.

Referring to the drawing, individual vehicle detectors 10, 11 and 12 have been shown. These detectors may be of any known type, such as of the photocell, radar, or treadle type. They may also be of the pulsed ultrasonic type as disclosed in the United States Patent No. 3,042,303, issued July 3, 1962. Each detector has associated therewith a relay such as relay DR1 which is connected to the output of detector 10. This relay DR1 is normally dropped away, as shown, but is picked up at least momentarily for each passing vehicle detected by detector 10. It is immaterial to the operation of the system of this invention whether the detector 10 maintains relay DR1 in its energized condition for only a very brief interval or for a longer interval; in any event, the momentary closure of front contact 13 of relay DR1 will cause the normally discharged capacitor 14 to be charged through a circuit extending from (B+), front contact 13, and capacitor 14 to ground. A similar contact and series capacitor is associated with each of the other relays DR2 and DR3, as well.

When vehical detector 10 has restored itself to the normal condition so that relay DR1 is dropped away, front contact 13 is opened and back contact 13 is then closed. Assuming for the present that neither of the other relays DR2 nor DR3 has operated, both relays RL2 and RL3 will be dropped away and their back contacts 15 and 16, respectively, will be closed. Therefore, as soon as back contact 13 closes, a circuit will be completed from ground, through capacitor 14, back contact 13 of relay DR1, the winding of relay RL1, back contacts 15 and 16 in series, and resistor 17, to ground. This circuit permits the charged capacitor 14 to discharge through the winding of RL1 so that it is picked up. The magnitude of capacitor 14 and the amplitude of the (B+) voltages, together with the time constant of the discharge circuit, are so selected that relay RL1 will remain up for a predetermined time interval which may be in the order of 100 milliseconds.

Each of the relays RL1–RL3 includes a contact which is instrumental in controlling the operation of relay CR. More specifically, contact 18 of relay RL1 has its heel connected through capacitor 19 to ground, and back contact 18 is connected through current limiting resistor 20 to the (B+) terminal. A similar charging circuit is provided for capacitors 21 and 22 as well so that each of these capacitors is normally in a fully charged condition. As soon as relay RL1 picks up in the manner described, its front contact 18 closes so that the charged capacitor 19 can now discharge through resistor 23 and the winding of relay CR to ground. The time constant of this discharge circuit, the characteristics of relay CR, and the amplitude of the (B+) voltage are selected to cause relay CR to remain picked up when thus energized for a length of time sufficient to properly operate counter 25 through closed front contact 24. The amount of time that relay CR remains picked up when any of capacitors 19, 21 or 22 is discharged through its winding is less than the length of time throughout which relay RL1 is picked up. This ensures that relay CR will go through a complete cycle of operation in response to the picking up of one of the relays RL1–RL3 during the time such relay is picked up and before it has had a chance to drop away. In one specific embodiment of this invention, these parameters were selected so that relay CR would remain picked up for substantially only 50 milliseconds; whereas, relay RL1 was picked up for 100 milliseconds, as already mentioned. Because of this, it is assured that when relay RL1, for example, drops away, relay CR will be in condition to respond immediately if another relay, such as relay RL2, then picks up.

A similar circuit organization is associated with each of the other relays RL2 and RL3 so that the picking up of either of these relays in response to the detection of a passing vehicle by the associated vehicle detector 11 or 12 will result in the momentary actuation of relay CR and the registration of a further count upon counter 25.

Let it now be assumed that while relay RL1 is in its picked-up condition and thereby effective to register a further actuation upon counter 25, the detector 11 registers the presence of a vehicle and picks up relay DR2. Capacitor 26 associated with this relay is immediately charged upon the closure of front contact 27 of relay DR2 and, upon the release of relay DR2 this capacitor is connected through closed back contact 27 to the winding of relay RL2. RL2 cannot pick up at this time, however, since relay RL1 is still picked up so that its back contact 28 is opened. Despite this fact, the capacitor 26 continues to store the charge it acquired when relay DR2 picked up and thereby stores the fact that a vehicle was registered by vehicle detector 11. This condition remains stored in capacitor 26 and is not erased therefrom until back contact 28 of relay RL1 closes and permits capacitor 26 to discharge through the winding of relay RL2. When this happens, DL2 picks up and this results in another operation of relay CR because of the discharging of capacitor 21 through the winding of relay CR so that a further count is applied to counter 25. Thus, it can be seen that concurrent vehicle detections by different detectors are converted into time-spaced counts so that the counter 25 is operated sequentially. The circuits for the several relays RL1–RL2 are all interlocked in the manner described. Thus, the pick-up circuit for each relay includes in series the back contacts of the remaining vehicles so that no one of these relays can be picked up unless all of the others are at that time dropped away.

If vehicles are detected concurrently by detectors 11 and 12 at a time just after a vehicle has been detected by detector 10 so that relay RL1 is still picked up, neither relay RL2 or RL3 can, of course, pick up because of the open back contacts 28 and 29 of relay RL1 respectively in the pick-up circuits for these two relays. Nevertheless, when relays DR2 and DR3 both drop away, their respective charged capacitors 26 and 30 will be connected to the windings of these relays. When relay RL1 drops away, both back contacts 28 and 29 will close and a circuit will then be completed for both relays RL2 and RL3 for a very brief instant. Both of these relays cannot pick up simultaneously, however, since the picking up of either one will open the pick-up circuit for the other. Under these circumstances, it has been observed that there is a very brief "fight" between the two relays which lasts only a few milliseconds, however, at the end of which time one of the relays will pick up and the other remain dropped away. The latter relay continues in its dropped away condition but then, of course, picks up when the other relay has gone through its complete cycle of operation.

The invention has disclosed a system for a convenient and economical circuit organization that makes it possible to apply randomly-occurring counts from a plurality of sources to a single counter. A relay system has been shown, but it will be appreciated that the principles of the invention may equally well be applied to systems using other types of electromagnetic or electronic devices. Moreover, although it has been shown as a system for applying counts directly to a counter, it will also be appreciated that the system is equally adaptable to the application of sequential counts to a communication circuit for transmission to a remote location. Other adaptations, modifications and alterations may be made to the specific form of the invention shown without in any manner departing from the spirit or scope of this invention.

What I claim is:

1. A system for coupling a plurality of object detectors to a common counter comprising in combination, a capacitor and a repeater relay associated with each said detector, means governed by said detector responsive to a passing object for first charging said capacitor and then connecting said capacitor in circuit with said relay, circuit means governed by said relays for completing a discharge circuit including any one relay and its associated capacitor only when all others of said relays are in their normal conditions, and counter control means coupling each said relay to said counter and controlling said counter to advance one step each time any one of said relays is operated from its normal condition.

2. The system as defined in claim 1 wherein said detector includes relay means operated from its normal condition momentarily for each object detected, said relay means when operated from its normal condition connecting said capacitor to a source of energy to charge said capacitor, said relay means when restored to its normal condition connecting said capacitor in circuit with said relay.

3. The invention as defined in claim 1 wherein said counter control means includes a second relay and control means for said second relay governed by each of said repeater relays, said control means actuating said second relay in response to the actuation of any one of said repeater relays, said second relay when actuated advancing said counter a single step.

4. Apparatus for operating a counter in response to individual actuations of a plurality of independently operated object detection means each being operated once for each object detected comprising, a first relay coupled to each said detector and actuated momentarily in response to each passing object, a capacitor for each detector being charged in response to the actuation of the associated first relay, a second relay for each detector, means responsive to the restoration of said first relay to its normal condition for connecting said capacitor in series with the winding of said second relay only provided that all others of said second relays are then in their respective normal conditions, and counter control means governed jointly by all said second relays for momentarily energizing said counter in response to each actuation of one of said second relays.

5. The apparatus of claim 4 wherein said counter control means includes, a capacitor for each second relay, means for charging each said capacitor when said associated second relay is in its normal condition, and means responsive to the charge on said capacitor when the associated second relay is actuated for applying an input count to said counter.

References Cited in the file of this patent

FOREIGN PATENTS

| | | |
|---|---|---|
| 564,453 | Great Britain | Sept. 28, 1944 |
| 669,294 | Great Britain | Apr. 2, 1952 |
| 726,883 | Great Britain | Mar. 23, 1955 |